E. STINER & J. M. KOSS.
RESILIENT WHEEL.
APPLICATION FILED FEB. 25, 1918.

1,272,558.

Patented July 16, 1918.

INVENTORS
Earl Stiner and John M. Koss,
BY
ATTORNEYS.

UNITED STATES PATENT OFFICE.

EARL STINER AND JOHN M. KOSS, OF DETROIT, MICHIGAN.

RESILIENT WHEEL.

1,272,558.  Specification of Letters Patent.  Patented July 16, 1918.

Application filed February 25, 1918. Serial No. 218,964.

*To all whom it may concern:*

Be it known that we, EARL STINER and JOHN M. KOSS, citizens of the United States of America, residing at Detroit, in the county of Wayne and State of Michigan, have invented certain new and useful Improvements in Resilient Wheels, of which the following is a specification, reference being had therein to the accompanying drawings.

This invention relates to resilient wheels, and our invention aims to provide a substantial wheel with cushioning element between the body of the wheel and the rim thereof, with all of the cushioning elements coöperating to sustain the body of the wheel concentrically of the rim thereof.

Our invention further aims to provide an automobile or truck wheel that obviates the necessity of using pneumatic or solid rubber tires, and provision is made in a manner as hereinafter set forth, for protecting the cushioning elements of the wheel from mud and foreign matter.

Our invention will be hereinafter specifically described and then claimed, and reference will now be had to the drawings wherein—

Figure 1:
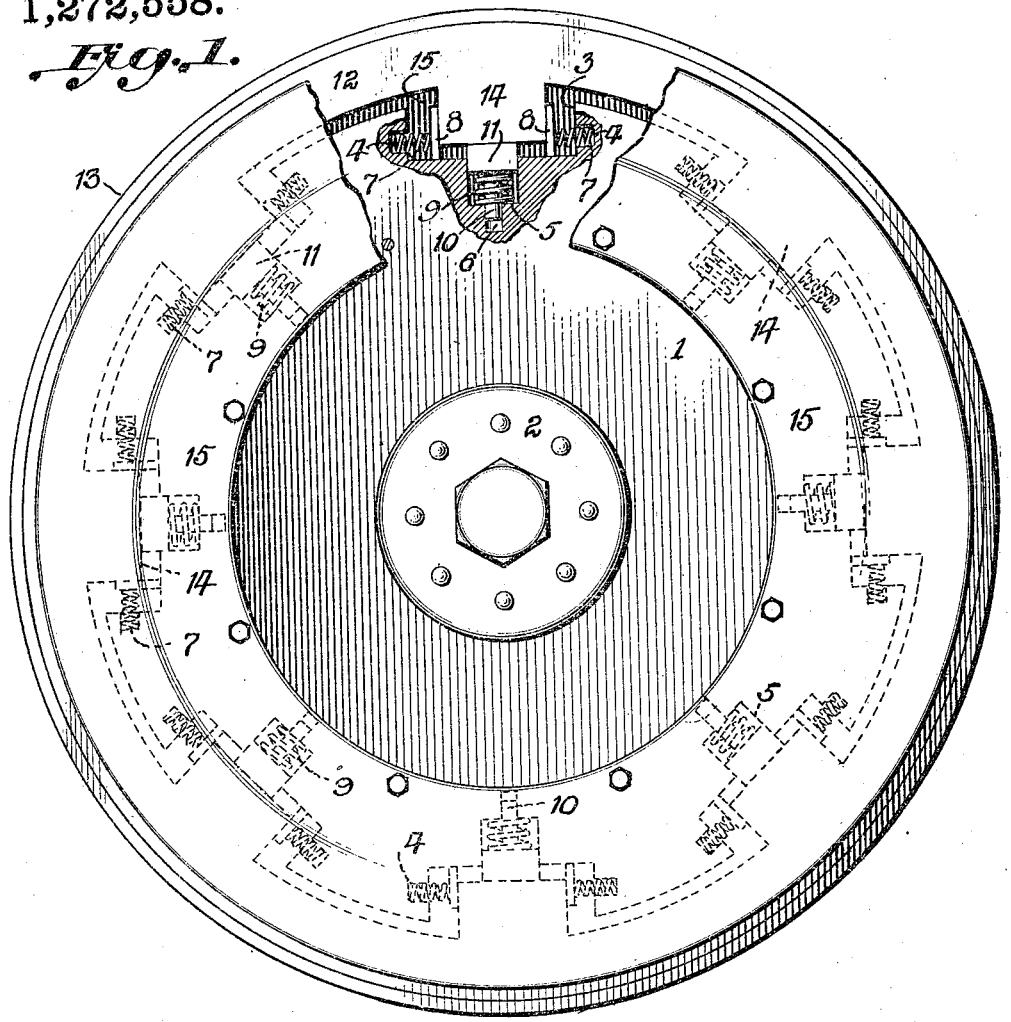
Figure 2:
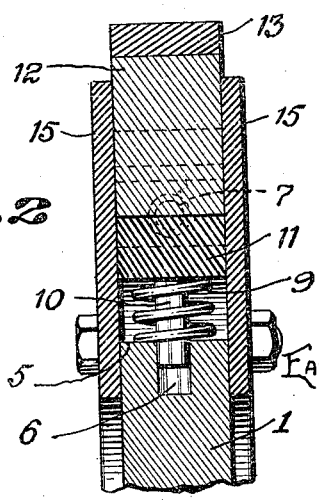

Figure 1 is a side elevation of a wheel, partly broken away and partly in section, and Fig. 2 is a cross sectional view of a portion of the wheel.

Our wheel comprises a circular body 1 having a conventional form of hub 2, and the periphery of the body 1 is provided with a plurality of equally spaced recesses 3. The side walls of the recesses 3 are provided with pockets 4 and the bottom walls of the recesses 3 have large pockets 5 and sockets 6.

In the pockets 4 are placed coiled compression springs 7 that bear against slide blocks 8.

In the pockets 5 are placed coiled compression springs 9 of greater expansive force than the springs 7, and extending through the springs 9 into the socket 6 are guide pins 10 carried by slide blocks 11. The slide blocks 11 are adapted to slide in the pockets 5 and the guide pins 10 maintain the springs centrally of said pockets.

In spaced relation to the periphery of the body 1 is a rim 12 having a suitable tire 13 and said rim is provided with inwardly projecting enlargements 14 presenting flat faces to the slide blocks 8 and 11.

Suitably connected to the body of the wheel 1, at each side thereof, are circular side plates 15 that extend on to the sides of the rim 12 and close the space between the body of the wheel and said rim, thus preventing mud, stones and other matter from interfering with the movement of the body of the wheel relative to the rim 12.

All of the springs 7 and 9 coöperate in maintaining the body of the wheel concentrically of the rim thereof, and during any shifting action of the wheel body, the blocks 8 and 11 may slide relative to the enlargement 14.

It is thought that the utility of our wheel will be apparent without further description, and while in the drawing there is illustrated a preferred embodiment of the invention, it is to be understood that the structural elements are susceptible to such variations and modifications as fall within the scope of the appended claims.

What we claim is:—

1. A resilient wheel comprising a circular body having the periphery thereof provided with a plurality of recesses, and the walls of said recesses provided with pockets, compression springs in the pockets of said wheel body, slide blocks against said springs with one of the slide blocks in each recess extending into one pocket of each recess, a rim in spaced relation to the periphery of said wheel body, inwardly projecting enlargements carried by said rim and bearing against said slide blocks, and side plates carried by said wheel body and extending onto the sides of said rim.

2. A resilient wheel comprising a body, having the periphery thereof provided with recesses and the walls of each recess provided with pockets and one pocket of each recess provided with a socket, compression springs in the pockets of said wheel body, slide blocks against said springs with one of the slide blocks in each recess extending into one pocket of each recess and provided with a pin extending into the socket of the pocket, a rim in spaced relation to the periphery of said wheel body, enlargements carried by said rim and extending between some of said slide blocks on to the other of said slide
5 blocks, and side plates connected to said wheel body and extending on to the sides of said rim.

In testimony whereof we affix our signatures in presence of two witnesses.

EARL STINER.
JOHN M. KOSS.

Witnesses:
KARL H. BUTLER,
ANNA M. DORR.

Copies of this patent may be obtained for five cents each, by addressing the "Commissioner of Patents, Washington, D. C."